(12) United States Patent
Kurtz et al.

(10) Patent No.: US 6,601,455 B2
(45) Date of Patent: Aug. 5, 2003

(54) FORCE TRANSDUCER WITH ENVIRONMENTAL PROTECTION

(75) Inventors: Anthony D. Kurtz, Ridgewood, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 09/814,903

(22) Filed: Mar. 22, 2001

(65) Prior Publication Data

US 2002/0134166 A1 Sep. 26, 2002

(51) Int. Cl.[7] ............................................... G01B 7/16
(52) U.S. Cl. ..................................... 73/774; 73/862.629
(58) Field of Search ........................... 73/721, 756, 774, 73/862.04, 733, 718, 35, 706, 708, 862.627, 862.629, 862.631, 862.635, 862.637, 813, 826, 849; 338/4; 257/419

(56) References Cited

U.S. PATENT DOCUMENTS

| | | | | | |
|---|---|---|---|---|---|
| 4,196,784 A | * | 4/1980 | Suzuki et al. | ............... | 177/211 |
| 4,507,972 A | * | 4/1985 | Morita | ........................ | 73/708 |
| 4,513,623 A | * | 4/1985 | Kurtz et al. | ................... | 73/721 |
| 4,695,817 A | * | 9/1987 | Kurtz et al. | ................... | 338/4 |
| 5,614,678 A | | 3/1997 | Kurtz et al. | ................... | 73/727 |
| 5,955,771 A | | 9/1999 | Kurtz et al. | ................ | 257/419 |

* cited by examiner

Primary Examiner—Max Noori
(74) Attorney, Agent, or Firm—Duane Morris LLP

(57) ABSTRACT

A force transducer comprises a housing having a front and rear portions joined together by a platform, which platform is thinner than the housing portions. The platform contains at least one sensor which is operative to provide an output according to the extent of compression or expansion of the platform when a force is applied to the transducer housing. A compliant tubular member is secured at one end to the front portion of the housing and at the other end to the rear portion of the housing. The compliant tubular member surrounds the sensor to protect the sensor from the surrounding environment. The tubular member expands and contracts compliantly with the applied force so that the sensor which is mounted on the platform is substantially unimpeded by the tubular member and provides an output directly proportional to the force applied to the housing.

5 Claims, 5 Drawing Sheets

FORCE TRANSDUCER WITH ENVIRONMENTAL PROTECTION

FIELD OF THE INVENTION

The field of the present invention relates generally to transducers, and more particularly to a force transducer for measuring force, which includes environmental protection for the sensor elements located and associated with the transducer.

BACKGROUND OF THE INVENTION

The prior art is filled with numerous examples of force and pressure transducers. As one can ascertain, force and pressure are related and essentially pressure is determined in pounds per square inch while force would be determined in pounds. There are many different types of pressure and force transducers, but all have one thing in common in that they convert an applied force or pressure into stress in the plane of the sensors. These stresses can be conventionally measured and converted into electrical signals. The types of sensors vary, but the prior art discloses the use of piezoresistive sensors which are normally arranged in a bridge configuration.

In regard to this, the applicant herein, namely Kulite Semiconductor Products, Inc., has numerous patents related to pressure and force transducers and pressure sensor devices in general. For example, reference is made to U.S. Pat. No. 5,614,678, entitled, "High Pressure Piezoresisitve Transducer," issued on Mar. 25, 1997, and assigned to Kulite Semiconductor Products, Inc., the assignee herein, by A. D. Kurtz et al. See also U.S. Pat. No. 5,955,771, entitled, "Sensors for Use in High Vibrational Applications and Methods of Fabricating the Same," issued on Sep. 21, 1999, to A. D. Kurtz, et al., and assigned to Kulite Semiconductor Products, Inc., the assignee herein.

In particular, the '771 patent describes the use of semiconductor pressure transducers or force transducers which operate in harsh environments that may be corrosive or involve high temperatures or may be subjected to a high humidity or other deleterious environments.

A force transducer as indicated is a transducer which measures a force such as a pulling or pushing force. Such transducers are well known and can conventionally employ strain gages in the form of piezoresistive devices or other devices.

Based on the use of force transducers, the operating environment can be corrosive. In this manner, the prior art transducers or strain gages are protected by means of coating them with an epoxy or some other sealing element. Since the devices are normally exposed to air or exposed to the atmosphere in general, the devices can be subjected to moisture which can seep into the sealant and eventually corrode or otherwise destroy the strain gages, as well as abrasion and other physical effects, which would eventually over time create problems in transducer operations.

It is therefore an object of the present invention to provide a force transducer utilizing strain gages which are protected from outside harsh environments and can therefore increase the life and use of such a transducer.

SUMMARY OF THE INVENTION

A force transducer comprising a housing having a front and rear portions joined together by a platform, which platform is compliant compared to said front and rear portions and is adapted to receive an applied force which force causes said platform to tend to compress or expand as a function of the direction of said force applied force.

At least one sensor is mounted on said platform and operative to provide an output according to the extent of compression or expansion, and therefore according to the magnitude of said applied force.

a compliant tubular member is secured at one end to said front portion of said housing at said other end to said housing rear portion and positioned as secured to surround and enclose said sensor to thereby protect said sensor from the surrounding environment, said member expanding and contracting compliantly with said applied force to thereby enable said sensor to respond to said force substantially unimpeded by said tubular member.

DETAILED DESCRIPTIONS OF THE DRAWINGS

Figure 1:
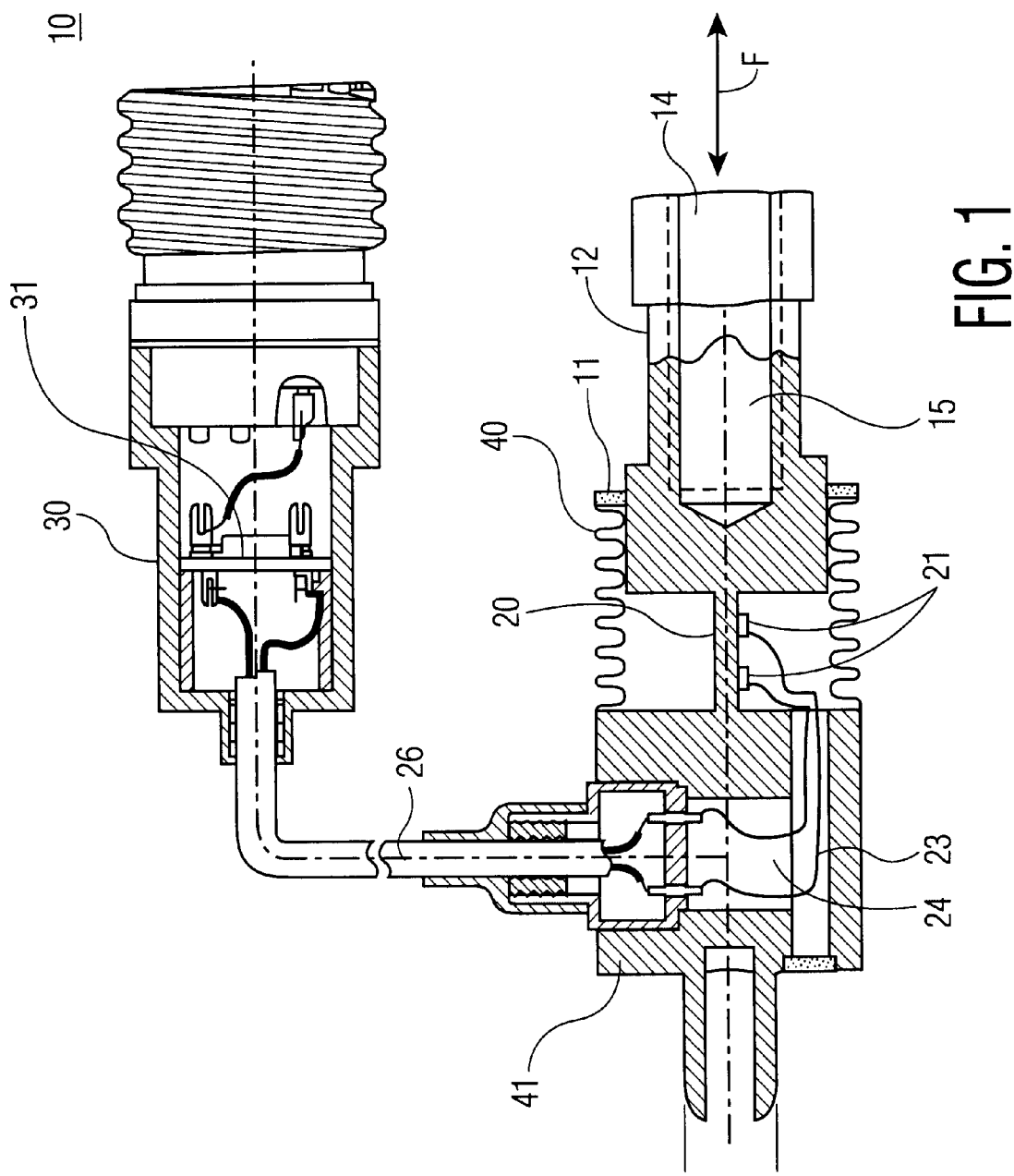
FIG. 1 shows a cross sectional view taken through lines A—A of FIG. 2 and depicting a force transducer according to this invention.

Referring to FIG. 1, there is shown a cross sectional view of a force transducer assembly according to this invention.

Figure 2:
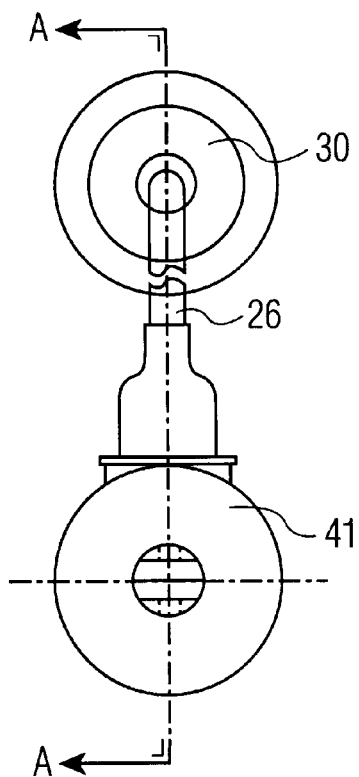
FIG. 2 shows a front view of the transducer shown in FIG. 1.
Figure 3:
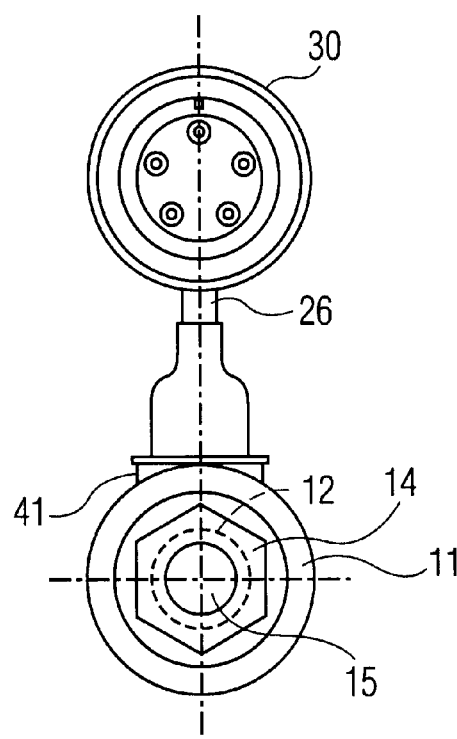
FIG. 3 shows a rear view of the transducer shown in FIG. 1.

FIG. 2 is a front view depicting a transducer and the housing, while FIG. 3 is a rear view depicting a transducer assembly shown in FIG. 1.

The transducer assembly 10 is constructed of a steel housing or a metal housing 11, which as seen has an input portion 12 which includes a nut or other securing mechanism 14 for the mounting of the transducer to a shaft or other mechanism to be monitored. Essentially, the portion 14 includes an internal hollow 15, may be inserted into a device such as an actuator rod, which rod would be pulled or pushed or subjected to a force F. This force F, as indicated, would thus pull or push the metallic housing.

Coupled directly and integrally formed with the front portion of the housing 12 is a bar or platform 20. As can be seen, the platform 20 is relatively thin as compared for example to the main body of the front portion of the housing 11. The platform 20 is positioned between the front housing portion 12 and the rear or back housing portion of section 41. The platform 20, as indicated, contains strain gages which may be piezoresistive strain gages 21. These strain gages are normally arranged in a Wheatstone bridge configuration and hence can produce an output according to the applied force as is well known in the field. While two gages 21 are shown, there are actually four gages to form a bridge (see FIG. 6).

In such bridge arrangements, two of the sensors are subjected to compression, while two are subjected to tension and therefore the output of the bridge is directly proportional to the force applied on the platform and responded to by the sensors. In the case of piezoresistive sensors, the resistance changes as a function of the force applied. In this manner, the change in resistance produces a voltage output which can be measured.

As seen in FIG. 1, there are two outputs or wires 23, 24 which emanate from the bridge circuit and which are coupled to connectors and are directed out from the housing via a cable 26. Each output 23 and 24 contains two wires (see FIG. 8). The cable 26 is coupled to a signal conditioning housing 30, which is also fabricated from stainless steel, and which for example contains an amplifier or other integrated circuit 31. The integrated circuit 31 is responsive to the output of the bridge circuit consisting of the strain gages 21, and therefore produces a sufficient electrical signal which may be further processed and utilized for determination of the magnitude of the applied force F.

Shown in FIG. 1 and surrounding the platform 20 containing the strain gages 21 is a bellows 40. The bellows 40 is typically fabricated of thin stainless steel and acts as a protective element completely closing the strain gages associated with the transducer. The bellows is made out of thin stainless steel and has a corrugated surface as typical of an accordion or a bellows configuration in general. In this manner, the bellows is strictly compliant and when a force is exerted on the front portion 12 of the transducer, the bellows moves with the force, where the force is transmitted to the platform 20. In this manner, the platform will tend to stretch according to the magnitude of the force applied to section 12. In this manner, the strain gages 21 associated with the bridge arrangement vary resistance in accordance with the magnitude of the applied force F, and will produce an output as is well known.

As one can see, the bellows 40 is welded to the housing section 12 having a peripheral flange 11 and is also welded directly to the rear or output housing portion 41. In this manner, the bellows, as one can ascertain, will contract and expand according to the force F without in any manner impeding or changing the value of the force applied to the platform 21. This is so because the bellows 40 is totally compliant. The major portion of the force will be of course applied to the relatively thin platform section 20, upon which the strain gages of the transducer are mounted. It is, of course, understood that the signal conditioning housing 30 containing the integrated circuit 31 or the additional signal conditioning circuitry as required is not necessary to the invention.

The major aspect of the invention is to completely enclose the strain gages 21 by means of the compliant bellows 40 which acts to totally isolate the strain gages from the deleterious environment which the transducer may operate in. In this manner, the strain gages are not subject to abrasion or external forces which otherwise may damage the strain gages or even dislodge the strain gages from the platform. Thus, the function of the bellows 40 is to provide a protective shield or shroud for the force transducer which shield fully encloses and protects the strain gages associated with the transducer from the deleterious environment.

It is, of course, understood that while piezoresistive strain gages are preferred any other type of strain gauge can be utilized such as wire gages, and so on. In a case of piezoresistive strain gages, these can be directly bonded to the stainless steel platform 20 by means of a suitable epoxy or by utilizing a glass frit. There are epoxies available which are designated as ultra high temperature strain gauge epoxies or cements.

The bellows, as indicated, is welded around the peripheral edges to the housing sections 11, 41 by means of a laser weld or by electron beam weld. Such techniques are well known. While the sensors are fully enclosed by the bellows, this can be done in a conventional atmosphere or essentially one can evacuate the internal hollow enclosing the transducers within the bellows and therefore create a vacuum assuring that there is no deleterious substance as oxygen or water contained in the vacuum enclosure.

Figure 4:
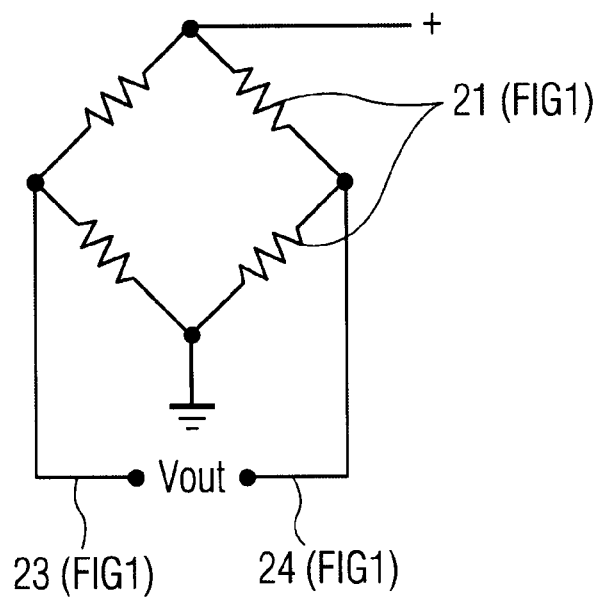
FIG. 4 is a schematic diagram of a Wheatstone bridge which may employ a strain gauge array of FIG. 1.

Referring to FIG. 4, there is shown a typical Wheatstone bridge assembly which can manifest the assembly containing strain gages 21 of FIG. 1. The Wheatstone bridge is a well-known circuit configuration and is conventionally used in many transducer structures as evidenced by the above-noted patents.

For examples of typical Wheatstone bridges and other arrangements of sensors, one can refer to U.S. Pat. No. 4,695,817, entitled, "Environmentally Protected Pressure Transducers Employing Interconnected Transducer Arrays," issued on Sep. 22, 1987, to A. D. Kurtz, et al., and assigned to the assignee herein. That patent shows full Wheatstone bridge or half Wheatstone bridge arrays associated with transducers and various other structures. The patent also shows a typical transducer housing which bears some resemblance to the housing described herein. Also seen in the 817 are that the piezoresistors are shown positioned beneath the diaphragms in order to provide environmental protection This is quite different than the present embodiment.

Figure 5:
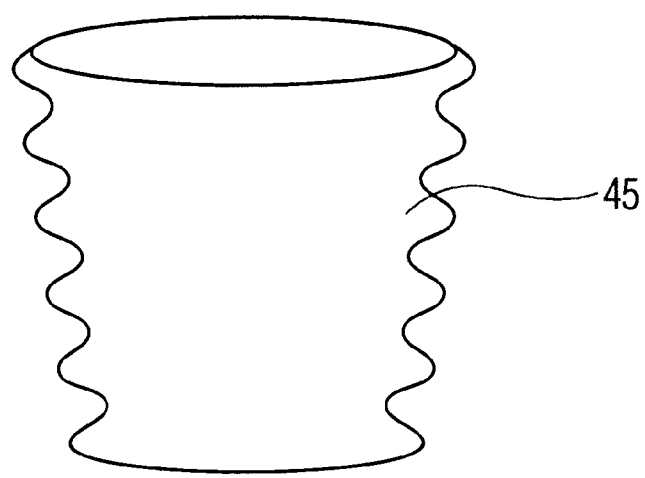
FIG. 5 is a perspective view of a typical bellows configuration used in this invention.

FIG. 5 shows a typical bellows configuration 45 which can be fabricated as an indicated from stainless steel, and so on. While it is shown with a corrugated surface, it is also known that any other type of bellows configuration such as a saw tooth and so on can be utilized as well.

Figure 6:
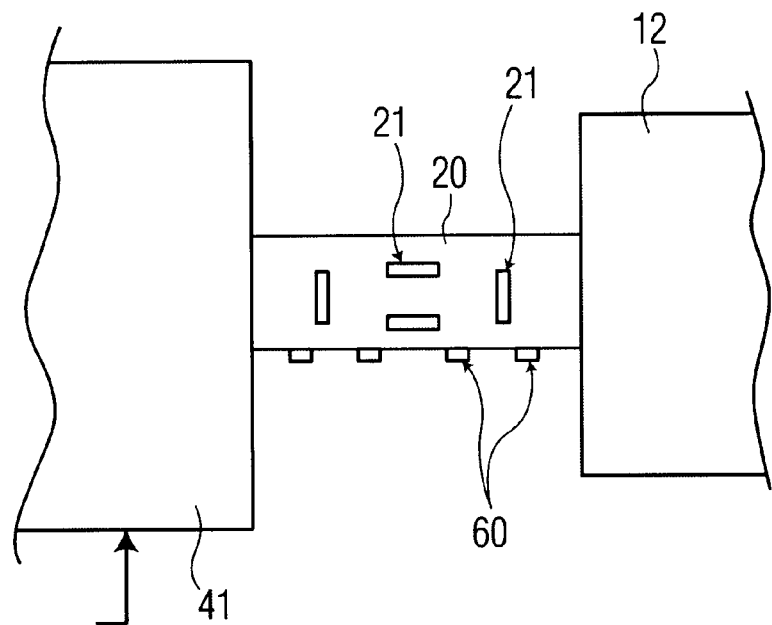
FIG. 6 is a cross sectional view showing the sensor configuration and the platform of the transducer in a clearer manner.
Figure 7:
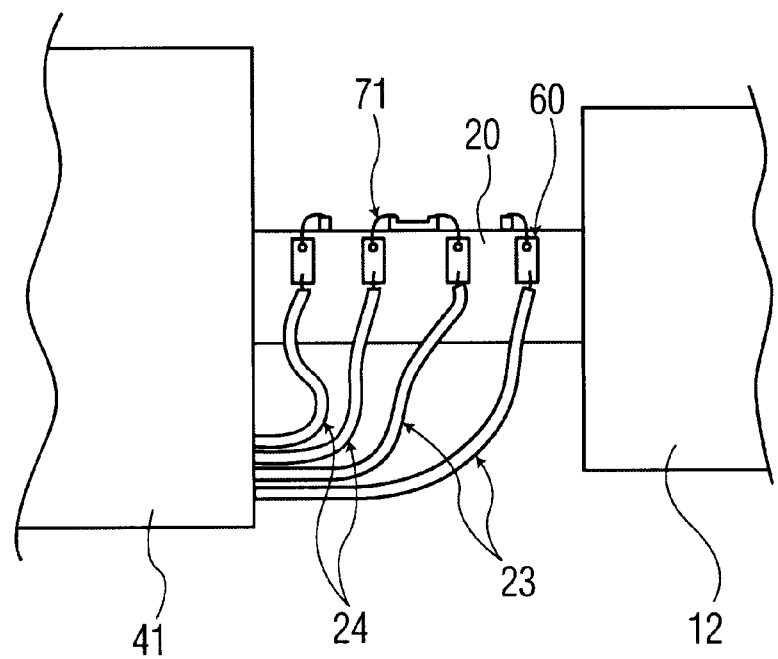
FIG. 7 is the same cross sectional view as FIG. 6, showing leads attached to the sensors and tabs.
Figure 8:
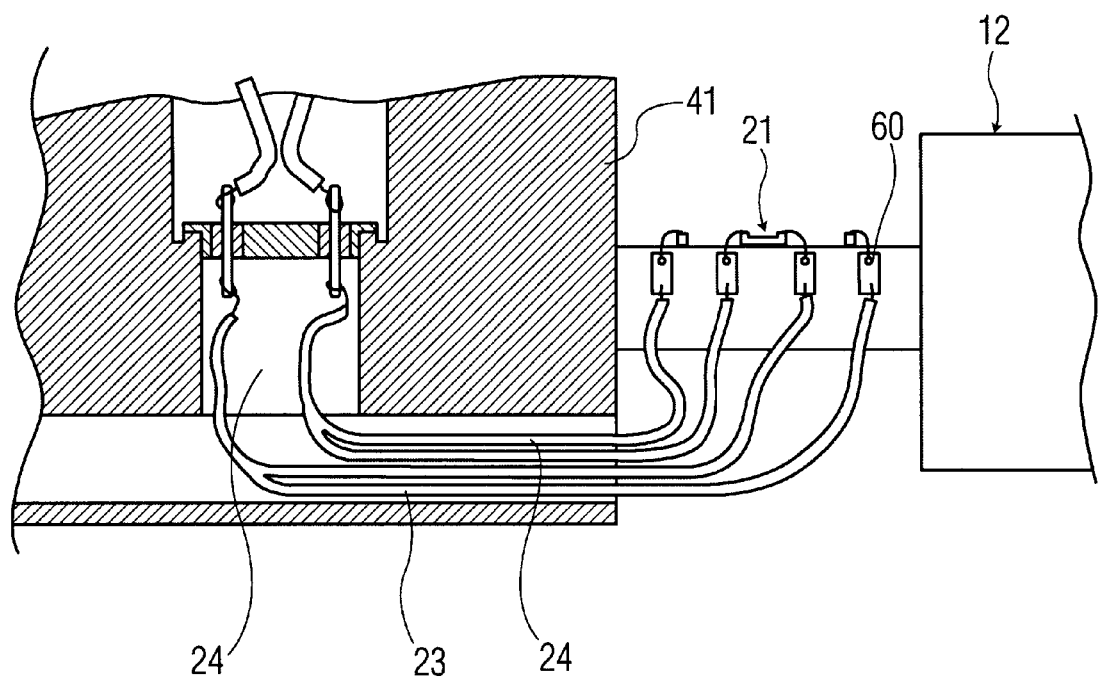
FIG. 8 is a more detailed cross sectional view showing the housings and showing how the leads are directed from the sensors to the front and back portions of the housings.

Also enclosed are FIGS. 6, 7 and 8. FIGS. 6, 7 and 8 utilize the same reference numerals as previously indicated in regard to the above-noted Figures. For example, in FIG. 6, there is shown the front housing portion 12, the platform 20 and the output housing section 41. Platform 20 has four sensors 21 mounted or secured thereto. As is known, the four gages operate as two longitudinal gages and two as Poisson. When a probe is applied the longitudinal gages go into tension and the Poisson gages go into compression. There is no bending involved, but the platform is actually stretched, therefore applying the tension and compression to the gages.

Wheatstone bridge configurations are quite well known. In FIG. 6, reference numeral 60 refers to the solder tabs which are located on the platform. In FIG. 7, reference numeral 71 refers to gold bonds which couple the solder tabs as 60 to the sensor. FIG. 8 shows the solder tabs, the sensors, the outputs 23 and 24 consisting of two wires a piece which eventually are connected at the terminals and are directed out. The same numerals have been indicated in these Figures as, for example, the numerals utilized in FIG. 1.

These and other structures will become apparent to those skilled in the art and such alternatives are deemed to be encompassed within the claims as appended hereto.

What is claimed is:

1. A force transducer comprising:
 a housing having front and rear portions joined together by a longitudinally extending platform, said platform being compliant and substantially thin compared to said front and rear portions, wherein said front portion of said housing includes an input member for coupling an actuator device that applies longitudinal pushing and pulling forces to said front portion of the housing, said front portion of said housing transmitting the longitudinal pushing and pulling forces to said longitudinally extending platform, the pushing forces longitudinally compressing all of said platform and the pulling forces longitudinally expanding all of said platform;

a plurality of piezoresistive strain gauges arranged in a Wheatstone bridge configuration and mounted on said platform, said strain gauges being operative to provide an output according to an extent of compression or expansion and therefore of a magnitude of said applied force;

a compliant, tubular, bellow shaped shroud fabricated from stainless steel and welded at one end to said housing front portion and at said other end to said housing rear portion and positioned and secured to surround and enclose said strain gauges to thereby protect said strain gauges from a surrounding environment, said shroud expanding and contracting compliantly and substantially along its longitudinal direction with said applied force, to thereby enable said strain gauges to respond to said force substantially unimpeded by such shroud.

2. The force transducer of claim 1, wherein said piezoresistive strain gauges are cemented to said platform.

3. The force transducer of claim 1, wherein said housing is fabricated from stainless steel.

4. The force transducer according to claim 1, further including a signal processor coupled to said Wheatstone bridge for providing an output processed signal.

5. The force transducer according to claim 1, wherein a hollow of said bellow shaped shroud as surrounding said strain gauges contains a vacuum.

* * * * *